United States Patent [19]

Wallin

[11] Patent Number: 4,672,792

[45] Date of Patent: Jun. 16, 1987

[54] ARRANGEMENT IN A SEALING MACHINE

[75] Inventor: Kay Wallin, Halmstad, Sweden

[73] Assignee: Sprinter System AB, Sweden

[21] Appl. No.: 817,735

[22] PCT Filed: Mar. 14, 1985

[86] PCT No.: PCT/SE85/00121

§ 371 Date: Nov. 12, 1985

§ 102(e) Date: Nov. 12, 1985

[87] PCT Pub. No.: WO85/04152

PCT Pub. Date: Sep. 26, 1985

[30] Foreign Application Priority Data

Mar. 14, 1984 [SE] Sweden ................ 8401435

[51] Int. Cl.[4] ................ B65B 7/20; B65B 7/26
[52] U.S. Cl. ................ 53/374; 53/377; 53/387; 198/689.1; 198/415
[58] Field of Search ................ 53/376, 377, 374, 387, 53/329; 198/689.1, 415, 416

[56] References Cited

U.S. PATENT DOCUMENTS

| | | | |
|---|---|---|---|
| 2,993,319 | 7/1961 | Gaubert | 53/377 X |
| 3,267,637 | 8/1966 | Baker | 53/376 X |
| 3,307,329 | 3/1967 | Lefief | 53/376 |
| 3,312,326 | 4/1967 | Huppenthal | 198/415 |
| 3,827,548 | 8/1974 | Matsuo | 198/689.1 |
| 3,889,801 | 6/1975 | Boyer | 198/689.1 |
| 3,890,763 | 6/1975 | Ullman | 198/416 X |
| 4,086,744 | 5/1978 | Seragnoli | 198/416 X |
| 4,499,990 | 2/1985 | Fishback | 198/415 X |
| 4,590,745 | 5/1986 | Randles | 53/377 X |

Primary Examiner—Horace M. Culver
Attorney, Agent, or Firm—Ostrolenk, Faber, Gerb & Soffen

[57] ABSTRACT

The present invention relates to an arrangement in a sealing machine through which there extends at least one conveyor (2,3,8,9), which has a plurality of constraining means (19) at predetermined spacing in the conveying direction for packages (7), which are intended to be sealed in the sealing machine after they have been filled. The conveying means comprises one or more belts (5,6,10,11) side by side and in the same plane and said constraining means comprises perforations (19) in the belts, the openings of the perforations facing towards the interior of the conveyor being in communication with a vacuum source and the openings facing towards the carrying surface of the conveyor being intended for coaction with the underside of the packages (7) placed on the conveying means and in that the packages (7) are located on the conveyor belt during conveying through the sealing machine with the aid of the suction achieved via the perforations (19) with the aid of the vacuum.

5 Claims, 2 Drawing Figures

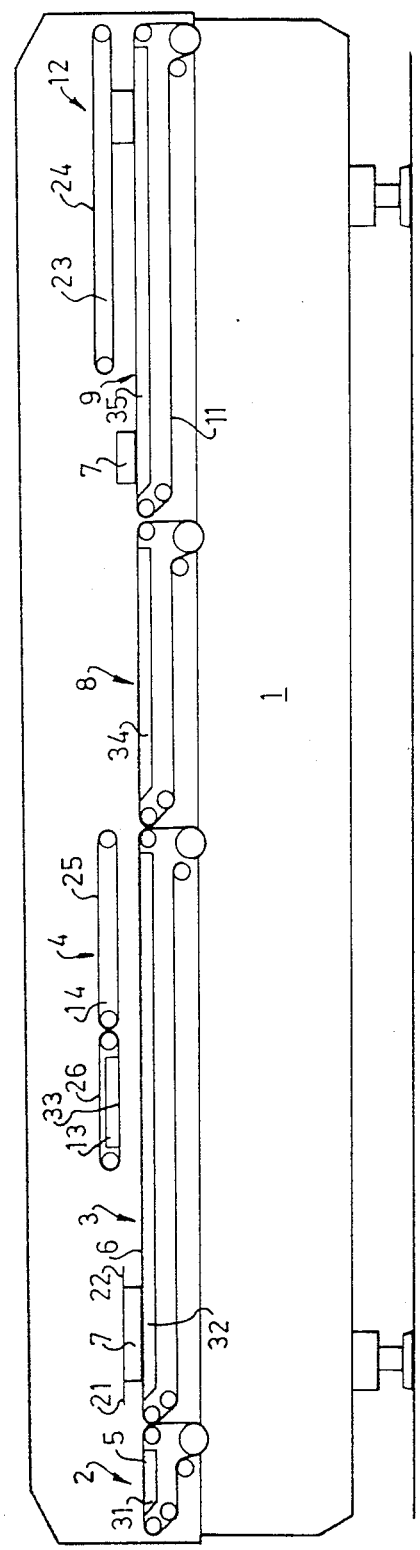
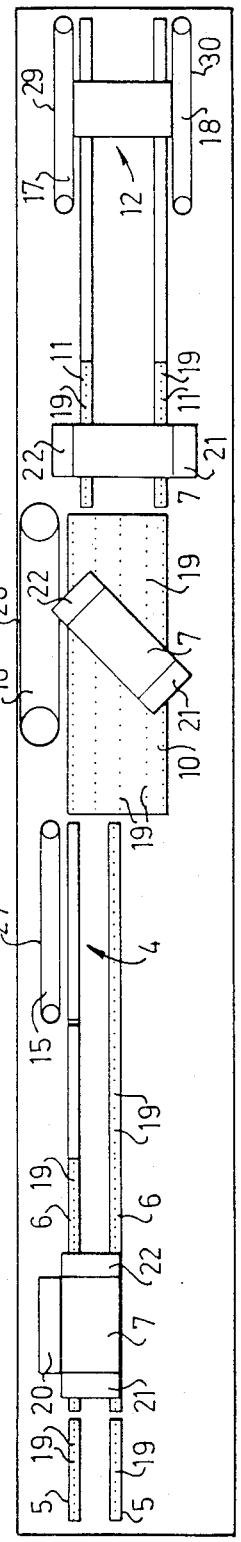
FIG.1
FIG.2

ARRANGEMENT IN A SEALING MACHINE

The present invention relates to an arrangement in a sealing machine through which there extends at least one conveyor, which has a plurality of constraining means at predetermined spacing in the conveying direction for packages which are intended to be sealed in the sealing machine after they have been filled.

So far in this type of sealing machine the conveyor has been one using chains and these have been provided with special flights in the form of pins or tongues at predetermined spacing in the longitudinal direction of the conveyor. Since the flight spacing has always been determined beforehand the spaces between the consecutive packages through the machine have been dependent on how great, or rather how long, the packages are which are to be sealed. When the packages are short or small the distance between each package will be great. In other words, the capacity of these sealing machines is always the same, irrespective of whether small or large packages are sealed. Also with this type of sealing machine there is a problem with synchronising the placing of the packages between the flights. It has furthermore been found difficult to prevent slopping over of the contents of the packages when they are moved to or from the respective flight.

The object of the present invention is to provide an arrangement in a sealing machine of the type mentioned in the introduction, in which the disadvantages present in the already known machines have been eliminated. Essentially distinguishing for the invention is that the conveyor comprises one or more belts running side by side and in the same plane, and that the constraining means comprise perforation configurations in the belts, the openings on the underside of the belts being in communication with a vacuum source, and the openings on the carrying side of the conveyor being intended to co-act preferably with the underside of bottom of the packages placed on the conveyor and to locate these with the aid of vacuum while they are conveyed through the sealing machine.

By means of the present invention the packages are now retained along the conveyor during their conveyance through the machine merely with the aid of the vacuum existing in suction boxes in the interior of the conveyors, the suction acting on the underside and/or upper side of the packages via the perforations in the belts. There is thus no longer any need of flights, and the spacing between the packages on the conveyor is determined by the speed of the belts on the first conveyor relative that of the second conveyor at the entry to the sealing machine. In this way the spacing between the packages may be determined taking into account whether large and/or long packages or small and/or short ones are to be sealed, and the distances between packages can be equally as great, independent of package size. In this way optimum spacing of the packages which are to be sealed is achieved with the aid of the arrangement in accordance with the present invention.

The invention will now be described in detail below with reference to the accompanying drawings, whereon FIG. 1 is a schematic side view of a sealing machine in accordance with the present invention and FIG. 2 schematically illustrates a plan of the machine illustrated in FIG. 1.

A sealing machine in accordance with the present invention is illustrated in FIGS. 1 and 2, the machine including a base 1, over which there extends at least one conveying means, and in the conveying direction of the packages 7, which are to be sealed, the means comprises conveyors 2 and 3, 8 and 9. The conveyors 2, 3 and 9 include pairs of belts 5, 6 and 11 running side by side and in the same plane and having perforations 19 with their openings facing towards the interior of the conveyors being in communication with a vacuum source, and the openings facing towards the carrying surface of the belts being intended to co-act with the underside or bottom of the packages 7 placed on the conveyors 2, 3, 9. The vacuum source is connected to suction boxes 31, 32 and 35 situated in the conveyors, and these boxes have holes, not illustrated on the drawing, for registering with the perforations 19 in the belts 5, 6 and 11 when the belts glide over the boxes. The negative pressure in the suction boxes 31, 32 and 35 is sufficiently large for the packages 7 to be retained effectively against the belts by the suction which is maintained via the holes in the perforations 19. By varying the speed of the conveyor 2 at the entry to the sealing machine in relation to the following conveyor 3 a suitable spacing can be provided between the different types of package 7 which are to be sealed. There are two belt conveyors 13, 14 arranged for engagement against the upper sides of the packages 7 above the conveyor 3 in a region 4 for the actual flap sealing of the packages. The first conveyor 13 has belts 26 provided with perforations 19 in communication with a vacuum source via a suction box 33. The following belt conveyor 14 includes belts 25 which lack perforations in the illustrated embodiment. As will be seen from FIG. 2 there is a holding-down conveyor 15 with belts 27 arranged along, adjacent and at right angles to the belt 6, such as to transversely press in and seal a longitudinal flap 20 on the packages 7. The speed of the conveyor 13 is adjustable in relation to that of the conveyor 3, and with the aid hereof and the suction in the perforations 19 on the belts 26 due to the vacuum in the suction box 33, an oblique pull on the cover of the package 7 can be avoided or corrected when the cover is pressed down on to the package.

There is a package turning conveyor 8 with a wide belt 10 after the conveyor 3, and similar to previously described belts with perforations 19 it is in communication with a vacuum source via a suction box 34. This conveyor 8 is situated immediately after the flap sealing region 4 of the conveyor 3 and is implemented such that with the aid of a friction belt device 16 with belts 28 disposed along the conveyor 8 and at right angles thereto it turns to the packages 90°.

There may be one or more belts 28 equipped with a plurality of flights in the form of a small fingers or pins adapted for engaging with the packages 7 during the turning movement. The fingers which are not in use are retractable inwards towards the belts 28 in their travelling direction. The fingers are normally outstanding and retract automatically for transverse pressure or engagement by the packages 7. The speed of the belt 28 is preferably somewhat lower than that of the conveyor 8 for enabling as gentle turning as possible. The conveyor 9 is disposed to follow after the conveyor 8 and conveys the package 7 with its side flaps 21, 22 projecting out from it transverse the conveying direction along the conveyor 9, these side flaps 21, 22 being intended for sealing against the package in a flap sealing region 12. In this region there is a belt conveyor 23 with belts 24 for engaging against the upper side of the packing 7. As will be seen from FIG. 2 there are two further holding-down conveyors 17, 18 with belts 29, 30 in the flap sealing region 12 for pressing the side flaps 21, 22 against the side walls of the package 7. The belts 5, 6, 10, 11 used in the conveyors 2, 3, 8, 9 may preferably be toothed, with the central portion in which the perforations 19 are arranged lacking teeth on the side of the belts facing towards the suction boxes. The perforations 19 in the belts 5, 6, 10, 11 and 26 pass over holes in the suction boxes 31, 32, 33, 34, 35, these holes preferably having a diameter of 2 mm and are arranged consecutively at a spacing of preferably 12 mm. The perforations 19 in the belts 5, 6, 10, 11, 26 preferably have a diameter of 12 mm and are arranged in the longitudinal direction of the belts at a distance of preferably 30 mm.

The placing of the vacuum perforations 19 in the belts 5, 6, 10, 11 and 26 have a pitch corresponding to a disposition of the perforations 19 such that at least one perforation always co-acts with each of the packages 7 on the conveyors. The lesser the pitch between the perforations 19 in the belts is, the greater will be the attraction of the packages 7 to the conveyors.

I claim:

1. A package sealing machine having at least one conveyor for the packages and a plurality of positioning and constraining means spaced along said conveyor for positioning, constraining and closing packages on said conveyor;

each package having a lower side and an upper side opening defined by at least one longitudinal closing flap;

said package also having side flaps at said upper side opening;

said conveyor comprising one or more belts running side-by-side in the same plane;

a vacuum source;

a connection between said vacuum source and the lower surface of the conveyor;

said positioning and constraining means comprising perforations in and through said conveyor, the upper openings of said perforations terminating at the upper surface of the conveyor, being adapted to abut any package deposited thereon;

the lower opening of each perforation being adapted to be connected to said vacuum source as the conveyor traverses said vacuum source;

the upper openings of said perforations co-acting with the underside of packages placed on said conveyor to position said packages on the belts by means of the suction through said upper openings; and an additional conveyor in the positioning region to assist in positioning the packages and to participate in closing and sealing the opposite or upper side of each package;

said additional conveyor also having perforations which may be brought into communication with said vacuum source;

said additional conveyor comprising at least one belt running on edge above and at approximately right angles to said first-mentioned conveyor to engage the upper side of each package to press down and seal said longitudinal closing flap; and a third conveyor and a friction belt;

said third conveyor receiving each package from said first conveyor and the additional conveyor to cooperate with said friction belt to turn said package 90° in a horizontal plane; and a fourth conveyor having hold down belts to engage and seal the side flaps of each package;

at least one belt conveyor engaging the upper side of each package in the flap sealing area.

2. The package sealing machine of claim 1, wherein the belts are toothed belts and the perforations in them have a diameter of about 12 mm and are placed in rows after each other with a pitch of about 30 mm.

3. The package sealing machine of claim 1, wherein the source of suction comprises a plurality of suction boxes, holes in the suction boxes having a diameter of about 2 mm and are arranged in longitudinal rows with a pitch of about 12 mm.

4. The package sealing machine of claim 1, wherein the speed of the belt conveyor for engaging against the upper side of the packages is adjustable relative to that of the conveyor for avoiding pulling the package flaps askew when they are folded onto the package.

5. The package sealing machine of claim 1, wherein the friction belt device includes at least one belt with a plurality of constraining means in the form of small fingers or pins which are upstanding in their working position for engaging against the packages and are retractable inwardly towards the belt in a direction against its part of movement, said belt having a speed falling below that of the conveyor.

* * * * *